Aug. 19, 1958     J. H. NUTTMAN     2,847,803
CULTIVATOR DISK GRINDING APPARATUS

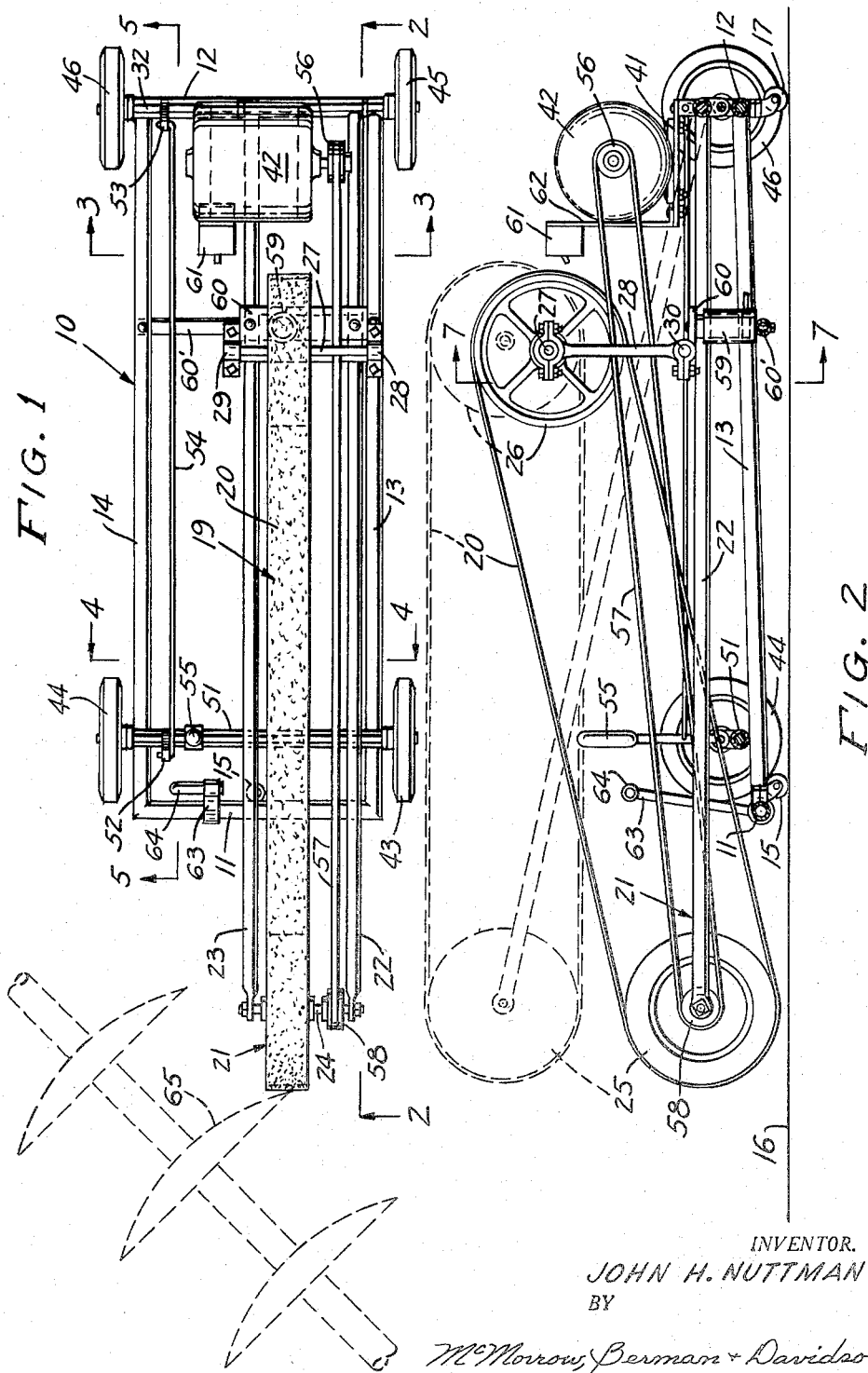

Filed Jan. 4, 1956     3 Sheets-Sheet 2

INVENTOR.
JOHN H. NUTTMAN
BY
McMorrow, Berman & Davidson
ATTORNEYS

Aug. 19, 1958  J. H. NUTTMAN  2,847,803
CULTIVATOR DISK GRINDING APPARATUS
Filed Jan. 4, 1956  3 Sheets-Sheet 3
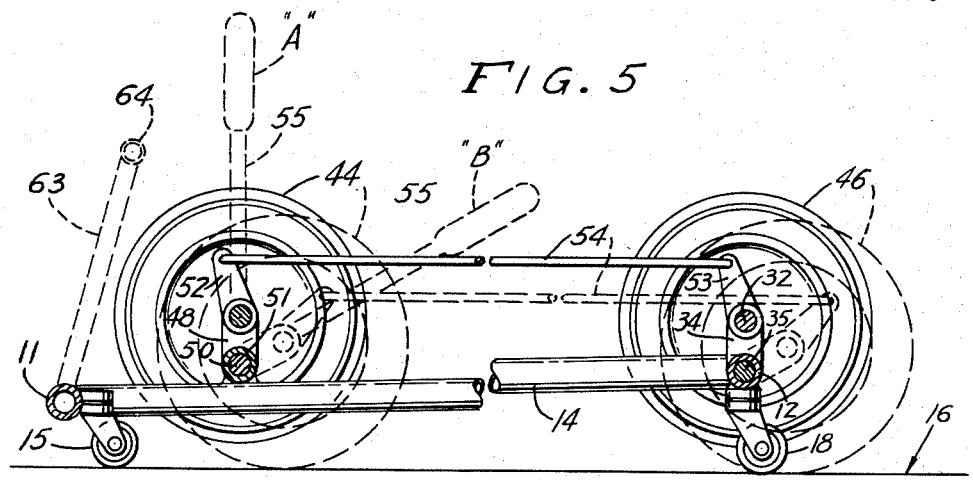
FIG. 5
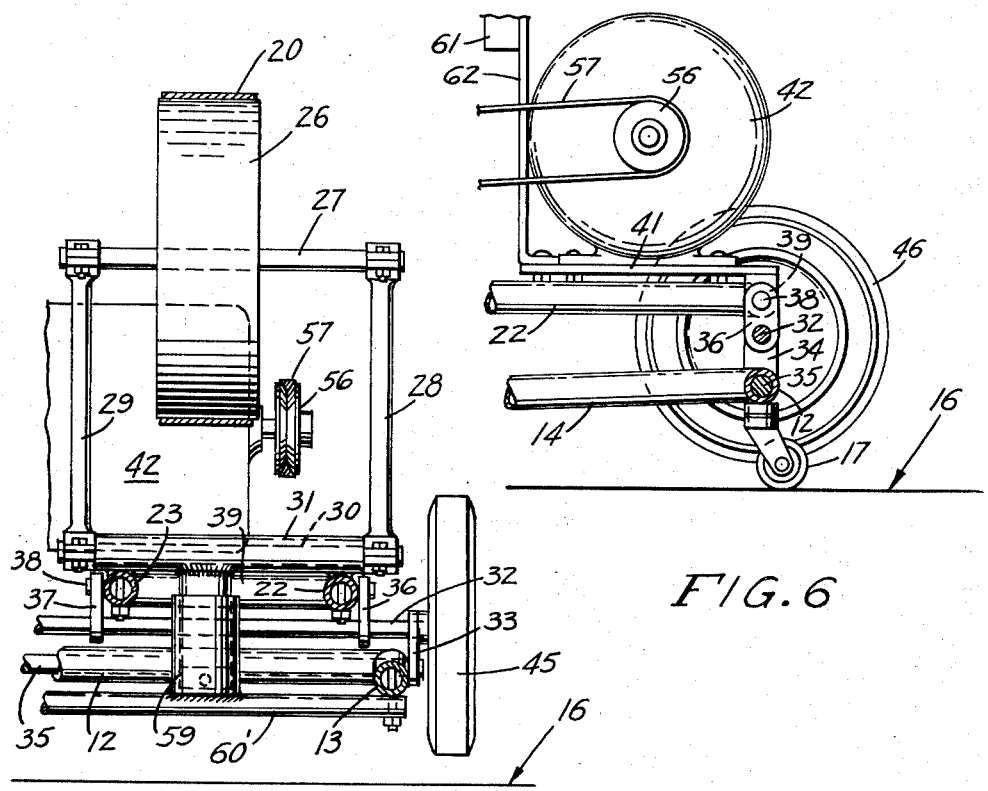
FIG. 6
FIG. 7
INVENTOR.
JOHN H. NUTTMAN
BY
McMorrow, Berman & Davidson
ATTORNEYS

United States Patent Office 2,847,803
Patented Aug. 19, 1958

2,847,803

CULTIVATOR DISK GRINDING APPARATUS

John H. Nuttman, Clarkston, Wash.

Application January 4, 1956, Serial No. 557,298

3 Claims. (Cl. 51—173)

The present invention relates to grinding apparatus and in particular to an apparatus for sharpening the cutting edge of a cultivator disk.

An object of the present invention is to provide an apparatus for sharpening the cutting edge of a cultivator disk which is mobile and may be easily moved from one location to another, and one which is easily moved into engagement with the disks on a cultivator without disassembly of the cultivator.

Another object of the present invention is to provide an apparatus for sharpening the cutting edge of a cultivator disk which does not overheat the cultivator disk or take the temper out of the cultivator disk.

A further object of the present invention is to provide an apparatus for grinding the edges of cultivator disks which has means by which the cultivator disk may be given a keen and polished edge portion.

A still further object of the present invention is to provide a grinding apparatus which is of sturdy construction, one simple in structure and having few parts, one which may be economically manufactured and assembled, and one which is highly efficient in action.

These and other objects and advantages of the present invention will be fully apparent from the following description when taken in connection with the annexed drawings, in which:

Figure 1 is a plan view of the grinding apparatus of the present invention,

Figure 2 is a view taken on the line 2—2 of Figure 1,

Figure 3:
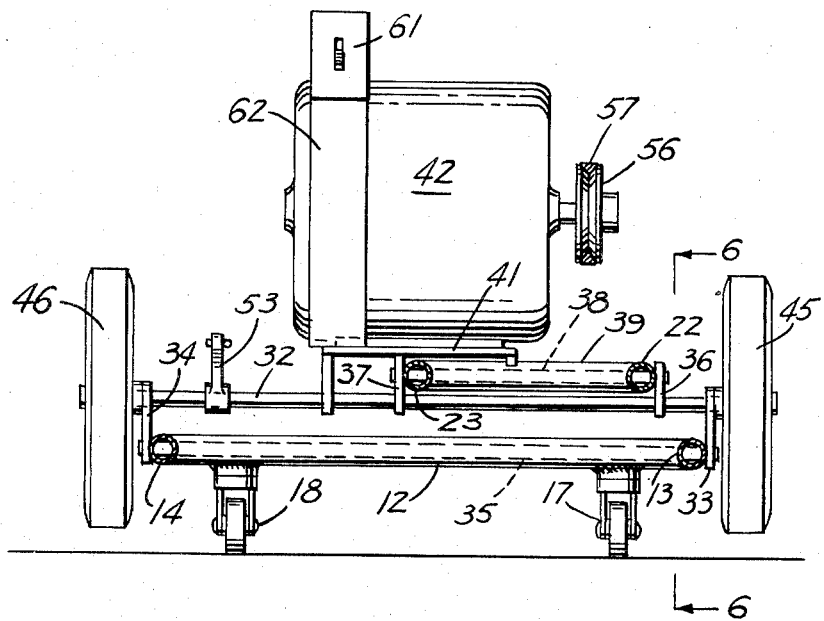
Figure 4:
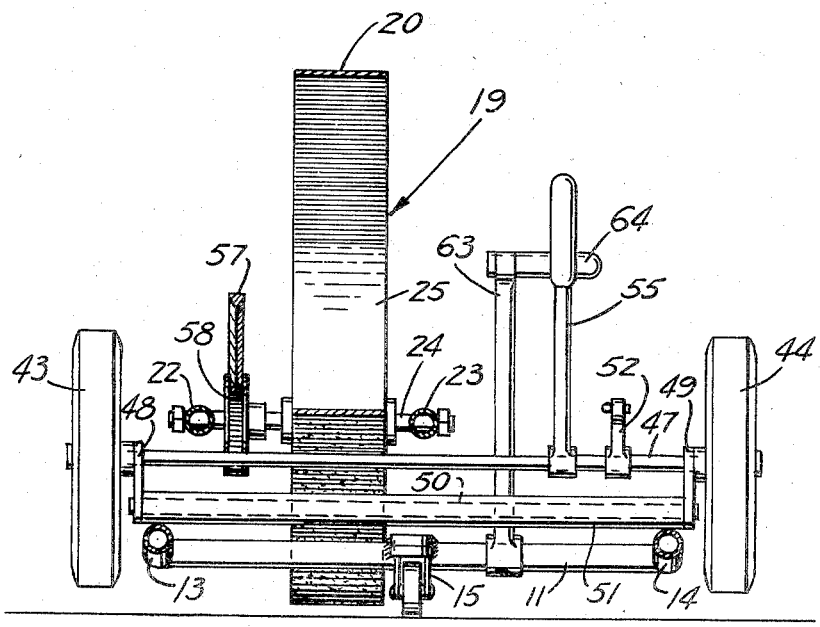

Figure 3 is a sectional view, on an enlarged scale, taken on the line 3—3 of Figure 1, Figure 4 is a sectional view, on an enlarged scale, taken on the line 4—4 of Figure 1, Figure 5 is a sectional view, on an enlarged scale, taken on the line 5—5 of Figure 1, Figure 6 is a sectional view, taken on the line 6—6 of Figure 5, and Figure 7 is a sectional view, on an enlarged scale, taken on the line 7—7 of Figure 2.

Referring in greater details to the drawings in which like numerals indicate like parts throughout the several views, the grinding apparatus of the present invention comprises a horizontally-disposed frame designated by the reference numeral 10 and including a front end member 11 and a rear end member 12 and side members 13 and 14 connecting the front member 11 and the rear end member 12 together.

A first rollable means embodying a caster 15 is carried by the front end member 11 intermediate the ends thereof for universal movement about a vertical axis and engages a ground surface as seen in Figures 1, 4, and 5, the ground surface being designated by the numeral 16. A second rollable means embodying a caster carried by each end of the rear end member 12 for universal movement about a vertical axis and engaging the ground surface 16 supports the rear end of the frame 10 above the ground surface 16, the last-named casters being designated by the numerals 17 and 18. The caster 15, as seen in Figure 4, has its stationary portion welded or otherwise secured to the inner face of the front end member 11 and supports the front end of the frame 10 at a lower level than the casters 17 and 18 which have their stationary parts secured to the under side of the rear end member 12.

An abrading assembly designated generally by the numeral 19 and including an endless traveling belt 20 is positioned longitudinally of the frame 10 with an end portion 21 forwardly of and adjacent the front end member 11. The endless traveling belt 20 is provided with an abrading outer surface, as seen in Figure 1. The assembly 19 includes a pair of longitudinally-extending horizontally-disposed tubular arms 22 and 23 which are arranged in spaced relation and rotatably support a shaft 24 in the ends which project beyond the front end member 11. A rotatable pulley 25 having a flat face is mounted on the shaft 24 and carries one end portion of the belt 20. A second pulley 26 carrying the other end portion of the belt 20 rotates about a horizontally-disposed fixed shaft 27 carried by and between the upper ends of a pair of upright shaft hangers 28 and 29 which have their lower ends clamped about the ends of a round bar 30. The bar 30 is fixed in a sleeve 31 which extends transversely of the arms 22 and 23 and is secured by welding or other means to the upper faces of the arms 22 and 23 at points spaced inwardly of the ends of the latter which are adjacent the rear end member 11.

The assembly 19 is connected to the frame 10 for movement from the position in which the end portion 21 is adjacent the front end member 11 to an elevated position above and spaced from the front end member 11. The means connecting the assembly 19 to the frame 10 includes, as seen in Figures 3, 6, and 7, a transversely-extending bar 32 extending above and in spaced relation with respect to the rear end member 12. The bar 32 is supported at its ends in the upper ends of a pair of upwardly-extending strap members 33 and 34 which have their lower ends fixedly secured to a round rod 35 extending through the rear end member 12. The transversely-extending bar 32 extends through holes in the lower ends of another pair of upright strap members 36 and 37. The upper ends of the strap members 36 and 37 have other holes through which extends a rod 38. Another sleeve 39 surrounds a portion of the rod 38 between the upper ends of the strap members 36 and 37. The sleeve 39 is welded between the arms 22 and 23, the arms being provided with holes for the projecting ends of the rod 38.

Another upright strap member 40 has its lower end rotatably mounted on the bar 32 adjacent to and spaced from the strap member 37 and has its upper end fixedly secured to the underface of a motor base 41 on which an electric motor 42 is secured. The motor base 41 is also bolted to the arm 23. The rotatable connection of the strap members 36 and 37 with respect to the bar 32 permits the upwardly and downwardly swinging movement of the abrading assembly 19 from the position in which the end portion 21 thereof is adjacent the front end member 11 to the elevated position, shown in dotted lines in Figure 2, in which it is above and spaced from the front end member 11.

A pair of wheels 43 and 44 are arranged in lateral spaced relation and are positioned adjacent the front end member 11. Another pair of wheels 45 and 46 also arranged in laterally-spaced relation are positioned adjacent the rear end member 12. The wheels 43 to 46, inclusive, are connected to the frame 10 for simultaneous movement from the position shown in solid lines in Figures 2 to 7, inclusive, in which position they are above the ground surface 16 to a position engaging the ground surface 16 and support the frame 10 above the ground surface 16. Specifically, the means operatively connecting the wheels 43 and 44 to the front end of the frame 10 includes, as seen in detail in Figures 4 and 5, another bar 47, similar to the bar 32, extending transversely of the frame 10 and having its ends fixedly secured in a pair of upstanding strap members 48 and 49. The wheels 43 and 44 are mounted upon the outer ends of the bar 47 for free rotation about the bar 47. The lower ends of the strap members 48 and 49 are fixedly secured to the ends of a rod 50, shown in dotted lines in Figure 4 and in cross-section in Figure 5, the rod 50 being supported within a sleeve 51 which is welded adjacent each of its ends to the upper face of the side members 13 and 14. The wheels 45 and 46 are freely rotatable about the outer end portions of the bar 32. An upright arm 52 has its lower end fixedly secured to the bar 47 and another upright arm 53 has its lower end fixedly secured to the bar 32. An actuating rod 54 connects the upper ends of the arms 52 and 53 together and an upright operating lever 55 has its lower end fixedly secured to the bar 47 for rotating the latter. When the lever 55 is moved from the dotted line position marked "A" in Figure 5 to the dotted line position marked "B" in that figure, the wheels 43 and 44 and the wheels 45 and 46 are moved from the full line position shown for the wheels 44 and 46 to the dotted line position in which they engage the ground surface 16 and support the frame 10 with the casters 15, 17, and 18, out of their ground-engaging positions. A pulley 56 on the shaft of the motor 42 carries one end of a V-belt 57, the other end of which is carried by a pulley 58 mounted upon the shaft 24 for driving the latter. A hydraulic jack assembly 59 has its upper end fixed to the under side of a plate 60 which extends between the arms 22 and 23 and is secured thereto. The lower end of the hydraulic jack assembly 59 is secured to a plate 60' which extends between and is secured to the side members 13 and 14. A switch box 61 is fixed to the upper end of a bracket 62 which is connected at its lower end to the motor base 41. An upright post 63 has its lower end fixed to the front end member 11 and carries on its upper end a horizontally-disposed handle 64 by means of which the apparatus is moved manually across the ground surface.

In operation, the cultivator disk grinding apparatus of the present invention is easily moved upon its wheels 43 to 46, inclusive, over a ground surface to a position in which the belt 20, where it passes over the pulley 25, may engage the edge portion of a cultivator disk 65, the latter being shown in dotted lines in Figure 1. The wheels 43 to 46, inclusive, support the apparatus while the belt 20 grinds one of the cultivator disks and the apparatus may be moved frowardly and backwardly to and from the disk being ground. The disk of a cultivator frequently is worn, warped, or in sprung condition, and the forward and backward movement of the apparatus compensates for the condition of the disk and permits the grinding of a keen edge upon the disk. When one disk has been ground to a sharp edge, the wheels are drawn up by moving the lever 55 from the "B" position to the "A" position and the apparatus is then lowered and supported and moved sidewise on its casters to a position for grinding another disk of the cultivator without lifting the apparatus. The hydraulic jack assembly 59 may be used to elevate the arms 22 and 23 so that the belt 20 may be used as a grindstone for sharpening other articles if desired.

What is claimed is:

1. A cultivator disk grinding apparatus comprising a horizontally-disposed frame including a front end member and a rear end member, a first rollable means carried by said front end member and engaging a ground surface, a second rollable means carried by said rear end member and engaging said ground surface, said first and second rollable means supporting said frame above said ground surface, an abrading assembly including an endless traveling belt provided with an abrading outer surface positioned longitudinally of said frame with an end portion forwardly of and adjacent the front end member and connected to said frame for movement from the position adjacent said front end member to an elevated position above and spaced from said front end member, and a pair of wheels arranged in lateral spaced relation positioned adjacent each of said front and rear end members and spaced above said ground surface and connected to said frame for simultaneous movement from the position above the ground surface to a position engaging said ground surface and supporting said frame above said ground surface.

2. A cultivator disk grinding apparatus comprising a horizontally-disposed frame including a front end member and a rear end member, a first rollable means embodying a caster carried by said front end member intermediate the ends of the latter for universal movement about a vertical axis and engaging a ground surface, a second rollable means embodying a caster carried by each end of said rear end member for universal movement about a vertical axis and engaging said ground surface, said first and second rollable means supporting said frame above said ground surface, an abrading assembly including an endless traveling belt provided with an abrading outer surface positioned longitudinally of said frame with an end portion forwardly of and adjacent the front end member and connected to said frame for movement from the position adjacent said front end member to an elevated position above and spaced from said front end member, and a pair of wheels arranged in lateral spaced relation positioned adjacent each of said front and rear end members and spaced above said ground surface and connected to said frame for simultaneous movement from the position above said ground surface to a position engaging said ground surface.

3. A cultivator disk grinding apparatus comprising a horizontally-disposed frame including a front end member and a rear end member, a first rollable means carried by said front end member and engaging a ground surface, a second rollable means carried by said rear end member and engaging said ground surface, said first and second rollable means supporting said frame above said ground surface, an abrading assembly including an endless traveling belt provided with an abrading outer surface positioned longitudinally of said frame with an end portion forwardly of and adjacent the front end member and connected to said frame for movement from the position adjacent said front end member to an elevated position above and spaced from said front end member, a pair of wheels arranged in lateral spaced relation positioned adjacent each of said front and rear end members and spaced above said ground surface and connected to said frame for simultaneous movement from the position above said ground surface to a position engaging said ground surface and supporting said frame above said ground surface, and means operatively connected to said abrading assembly for effecting the movement of the latter from the position adjacent said first end member to the elevated position above and spaced from said front end member.

References Cited in the file of this patent
UNITED STATES PATENTS

| | | |
|---|---|---|
| 2,401,670 | Spetz | June 4, 1946 |
| 2,498,951 | Froese | Feb. 28, 1950 |
| 2,621,350 | Bye | Dec. 16, 1952 |
| 2,655,770 | Parovel | Oct. 20, 1953 |
| 2,723,657 | Jones | Nov. 15, 1955 |
| 2,742,742 | Barrett | Apr. 24, 1956 |